(12) United States Patent
Zhang et al.

(10) Patent No.: US 11,668,326 B2
(45) Date of Patent: Jun. 6, 2023

(54) CEILING FAN AND HANGING HEAD CONNECTING MECHANISM THEREOF

(71) Applicant: FOSHAN CARRO ELECTRICAL CO., LTD., Foshan (CN)

(72) Inventors: Jian-Sheng Zhang, Foshan (CN); Zhi-Qiang Yuan, Foshan (CN)

(73) Assignee: Foshan Carro Electrical Co. Ltd., Foshan (CN)

( * ) Notice: Subject to any disclaimer, the term of this patent is extended or adjusted under 35 U.S.C. 154(b) by 0 days.

(21) Appl. No.: 17/693,752

(22) Filed: Mar. 14, 2022

(65) Prior Publication Data

US 2023/0118465 A1   Apr. 20, 2023

(30) Foreign Application Priority Data

Oct. 18, 2021  (CN) .......................... 202122500602.1

(51) Int. Cl.
| | |
|---|---|
| *F04D 29/64* | (2006.01) |
| *F04D 29/66* | (2006.01) |
| *F04D 19/00* | (2006.01) |
| *F16M 13/02* | (2006.01) |

(52) U.S. Cl.
CPC ......... *F04D 29/646* (2013.01); *F04D 19/002* (2013.01); *F04D 29/663* (2013.01); *F16M 13/027* (2013.01)

(58) Field of Classification Search
CPC .... F04D 29/646; F04D 19/002; F04D 29/663; F04D 25/088; F16M 13/027
See application file for complete search history.

(56) References Cited

U.S. PATENT DOCUMENTS

2020/0362910 A1* 11/2020 Zhang ................. F16C 11/0695

* cited by examiner

*Primary Examiner* — Aaron R Eastman
(74) *Attorney, Agent, or Firm* — Rosenberg, Klein & Lee

(57) ABSTRACT

A hanging head connecting mechanism of a ceiling fan has a connecting seat, a hanging rod, and a motor shaft. The connecting seat has a connecting plate, a first bushing, a second bushing, and multiple connecting pieces. The second bushing is located around the first bushing. The hanging rod is mounted in the connecting seat and disposed between the first bushing and the second bushing. The motor shaft is mounted in the connecting seat and disposed inside the first bushing. The connecting pieces are serially mounted through the second bushing, the hanging rod, and the motor shaft. Two of the connecting pieces are each mounted on a respective one of two opposite sides of the second bushing, and a wire-routing gap is formed between the first connecting piece and the second connecting piece.

11 Claims, 6 Drawing Sheets

CEILING FAN AND HANGING HEAD CONNECTING MECHANISM THEREOF

BACKGROUND OF THE INVENTION

1. Field of the Invention

The present invention relates to home appliances, especially to a ceiling fan and a hanging head connecting mechanism thereof.

2. Description of the Prior Arts

A ceiling fan is a kind of fan that is fixed on the ceiling. The ceiling fan is energy-saving, convenient, and useful, thereby being widely popular among consumers. However, people's standard of living keeps rising as material standard of living rises continuously, and therefore improving user experience of the ceiling fan is a challenge faced by most ceiling fan manufacturers.

An end of each fan blade of a conventional ceiling fan is usually fixed to a corresponding fan blade intersecting base, and another end of the fan blade intersecting base is bolted to a rotor of a fan motor. As a result, the conventional ceiling fan is likely to shake and wobble due to rotation of the fan blade, and in turn cause other structures of the ceiling fan to loosen and make noises, degrading user experience.

Additionally, in order to connect a hanging rod to a motor shaft of the conventional ceiling fan, the motor shaft is usually mounted in a lower end of a hanging head; the hanging rod is usually mounted in an upper end of the hanging head; a bolt is mounted transversely through the motor shaft, the hanging head, and the hanging rod such that the motor shaft and the hanging rod are both connected to the hanging head.

However, central parts of the motor shaft are configured for routing of electric wires, and the bolt is mounted transversely through the motor shaft hinders wire routing, thereby causing inconvenience for the overall structure assembly.

To overcome the shortcomings, the present invention provides a ceiling fan and a hanging head connecting mechanism of the ceiling fan to mitigate or obviate the aforementioned problems.

SUMMARY OF THE INVENTION

The main objective of the present invention is to provide a hanging head connecting mechanism of a ceiling fan that prevents hindrance of wire routing while maintaining structural stability of the connecting mechanism.

The hanging head connecting mechanism of the ceiling fan has a connecting seat, a hanging rod, and a motor shaft. The connecting seat has a connecting plate, a first bushing, a second bushing, and multiple connecting pieces. The first bushing and the second bushing protrude up from a top of the connecting plate. The second bushing is located around the first bushing. The hanging rod is mounted in an upper end of the connecting seat and is disposed between the first bushing and the second bushing. The motor shaft is mounted in a lower end of the connecting seat and is disposed inside the first bushing. Each of the connecting pieces is serially mounted through the second bushing, the hanging rod, and the motor shaft such that the hanging rod, the connecting seat, and the motor shaft are connected together. Two of the connecting pieces are respectively a first connecting piece and a second connecting piece. The first connecting piece and the second connecting piece are each mounted on a respective one of two opposite sides of the second bushing, and a wire-routing gap is formed between the first connecting piece and the second connecting piece.

The present invention has the following advantages.

First, the connecting seat has the connecting plate, the first bushing, and the second bushing. The first bushing and the second bushing are located on a top of the connecting plate. The second bushing is located around the first bushing. A gap configured to accommodate the hanging rod is formed on the upper end of the connecting seat by the connecting plate, the first bushing, and the second bushing.

Second, the hanging rod is located between the first bushing and the second bushing, and the motor shaft is disposed inside the first bushing. The hanging rod and the motor shaft are usually made of metal and therefore make noises when in direct contact. The connecting seat separates the hanging rod from the motor shaft, thereby effectively preventing noises due to direct contact between metal parts from structural vibrations of the hanging rod and the motor shaft.

Third, the connecting pieces which are each serially mounted through the second bushing, the hanging rod, and the motor shaft connect the hanging rod and the motor shaft and form the wire-routing gap. The connecting pieces keep a sufficient space for routing of electric wires inside the motor shaft by forming the wire-routing gap, and the connecting pieces ensure structural reliability of the hanging head connecting mechanism. As a result, the connecting pieces prevent hindrance of wire routing, keep the structure simple and reasonable, and maintains ease of installation at the same time.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
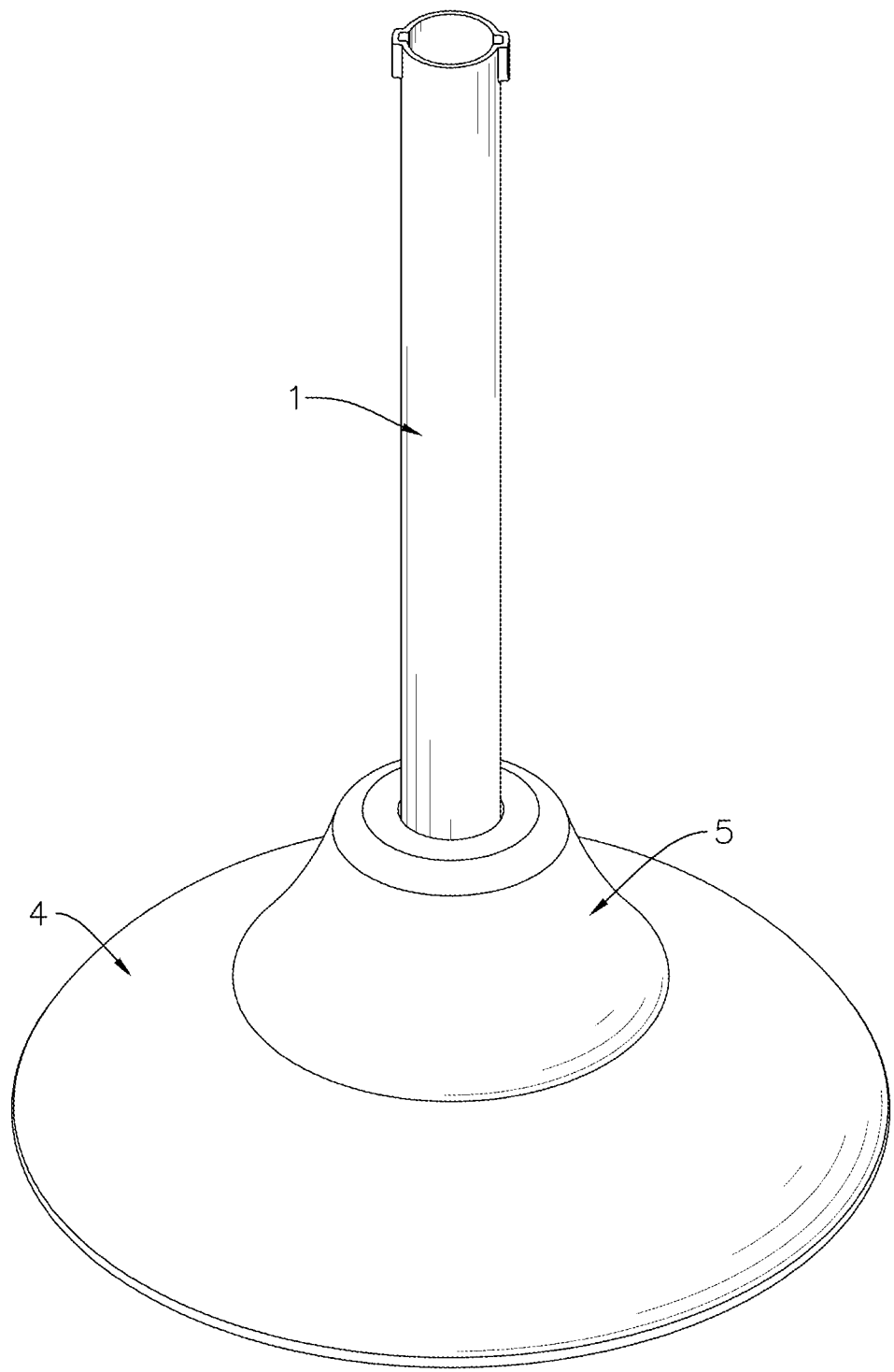
FIG. 1 is a partial perspective view of a ceiling fan in accordance with the present invention.
Figure 2:
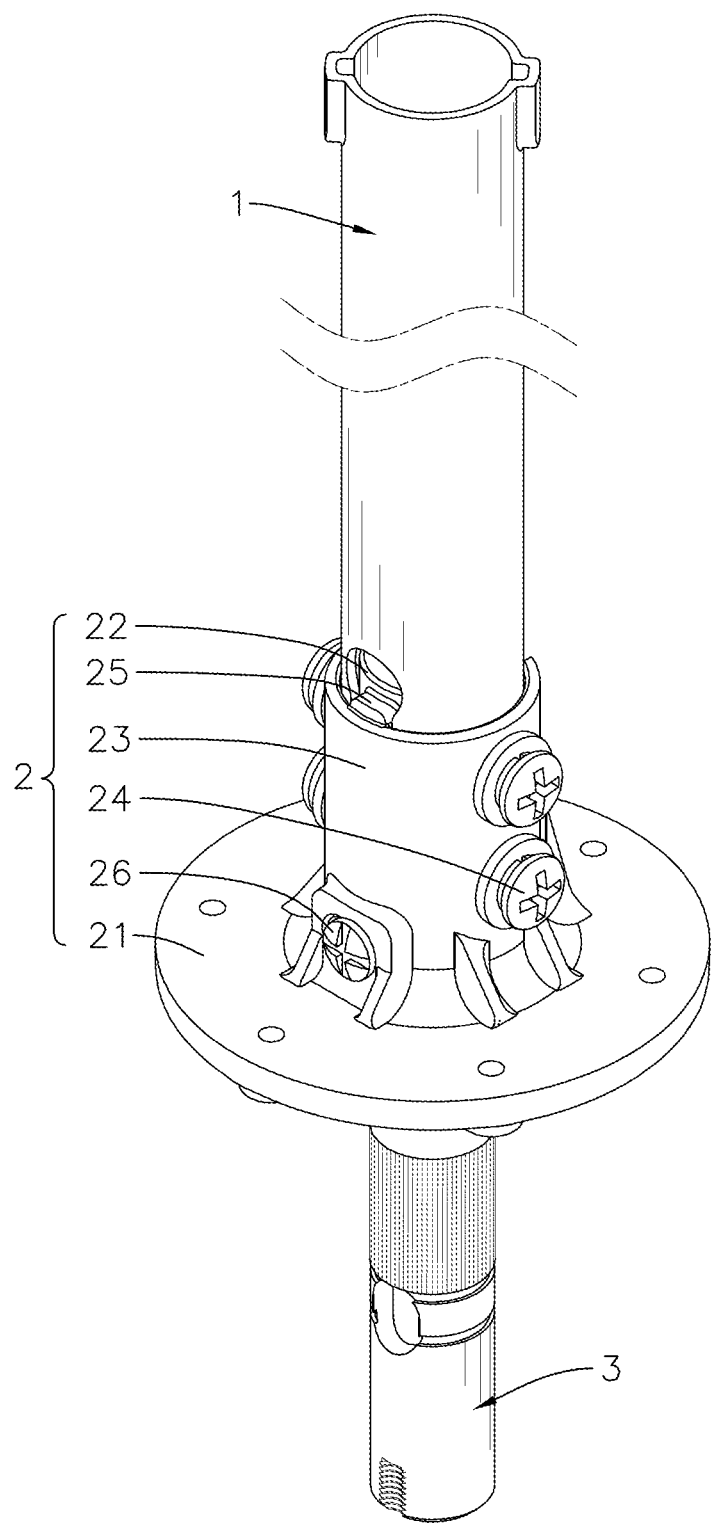
FIG. 2 is a partial perspective view of the ceiling fan in FIG. 1.
Figure 3:
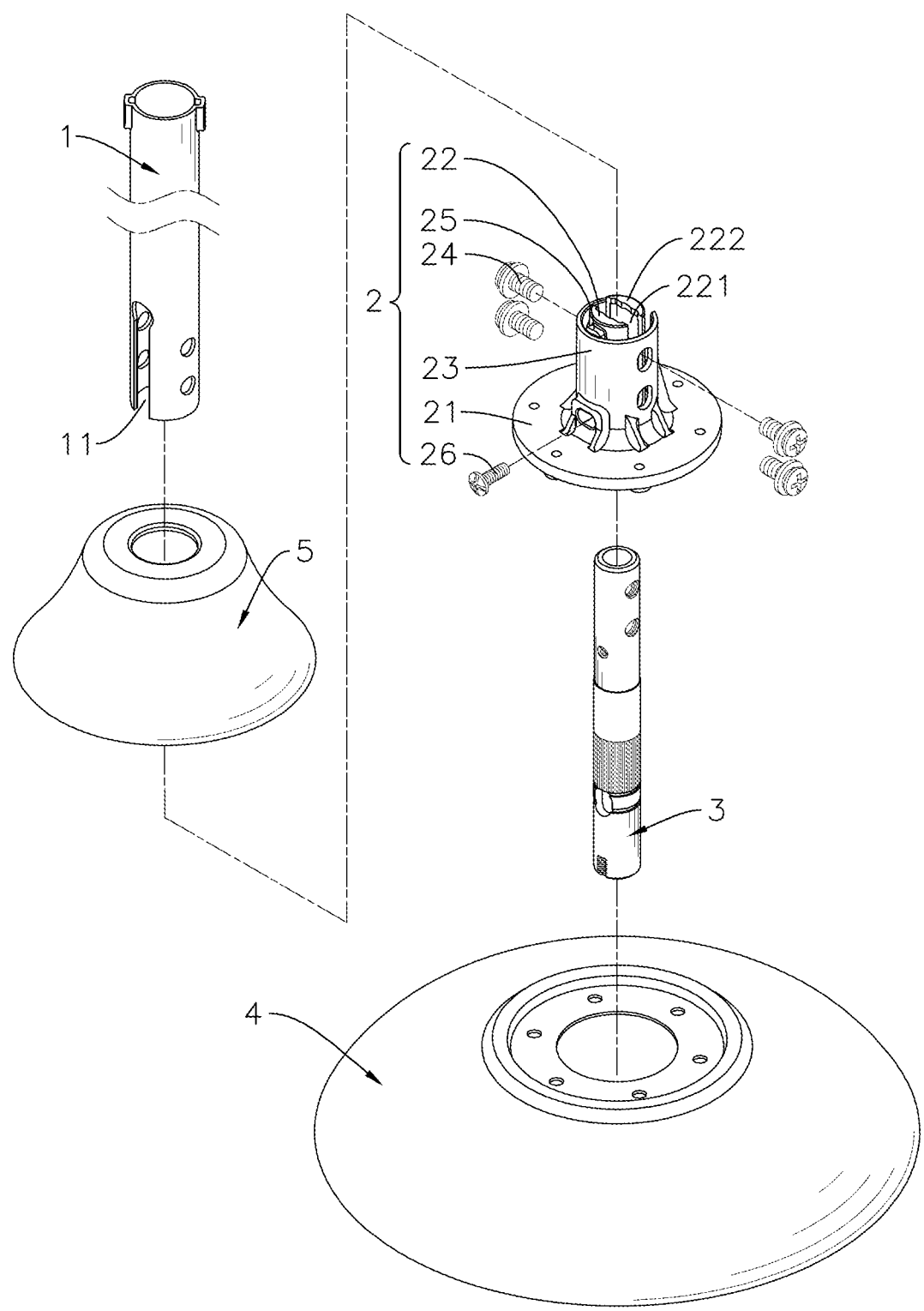
FIG. 3 is an exploded perspective view of the ceiling fan in FIG. 1.

With reference to FIGS. 1 to 6, to effectively prevent hindrance of wire routing, a hanging head connecting mechanism of a ceiling fan in accordance with the present invention is provided. The hanging head connecting mechanism comprises a hanging rod 1, a connecting seat 2, and a motor shaft 3. In the preferred embodiment, the hanging head connecting mechanism further comprises a soundproof cover 4 and a decorative casing 5.

The hanging rod 1 is mounted in an upper end of the connecting seat 2. The motor shaft 3 is mounted in a lower end of the connecting seat 2. The hanging rod 1 and the motor shaft 3 are connected together by the connecting seat 2 such that the hanging rod 1 and the motor shaft 3 are rigidly fixed together.

In the preferred embodiment, the connecting seat 2 has a connecting plate 21, a first bushing 22, a second bushing 23, and multiple connecting pieces 24. The first bushing 22 and the second bushing 23 are located on a top of the connecting plate 21. The second bushing 23 is located around the first bushing 22. A gap configured to accommodate the hanging rod 1 is formed on an upper end of the connecting seat 2 by the connecting plate 21, the first bushing 22, and the second bushing 23.

The hanging rod 1 is disposed between the first bushing 22 and the second bushing 23. The motor shaft 3 is disposed inside the first bushing 22. The hanging rod 1 and the motor shaft 3 of a ceiling fan are usually made of metal and therefore make noises when in direct contact. The connecting seat 2 separates the hanging rod 1 from the motor shaft 3, thereby effectively preventing noises due to direct contact between metal parts from vibrations of the hanging rod 1 and the motor shaft 3.

Figure 5:
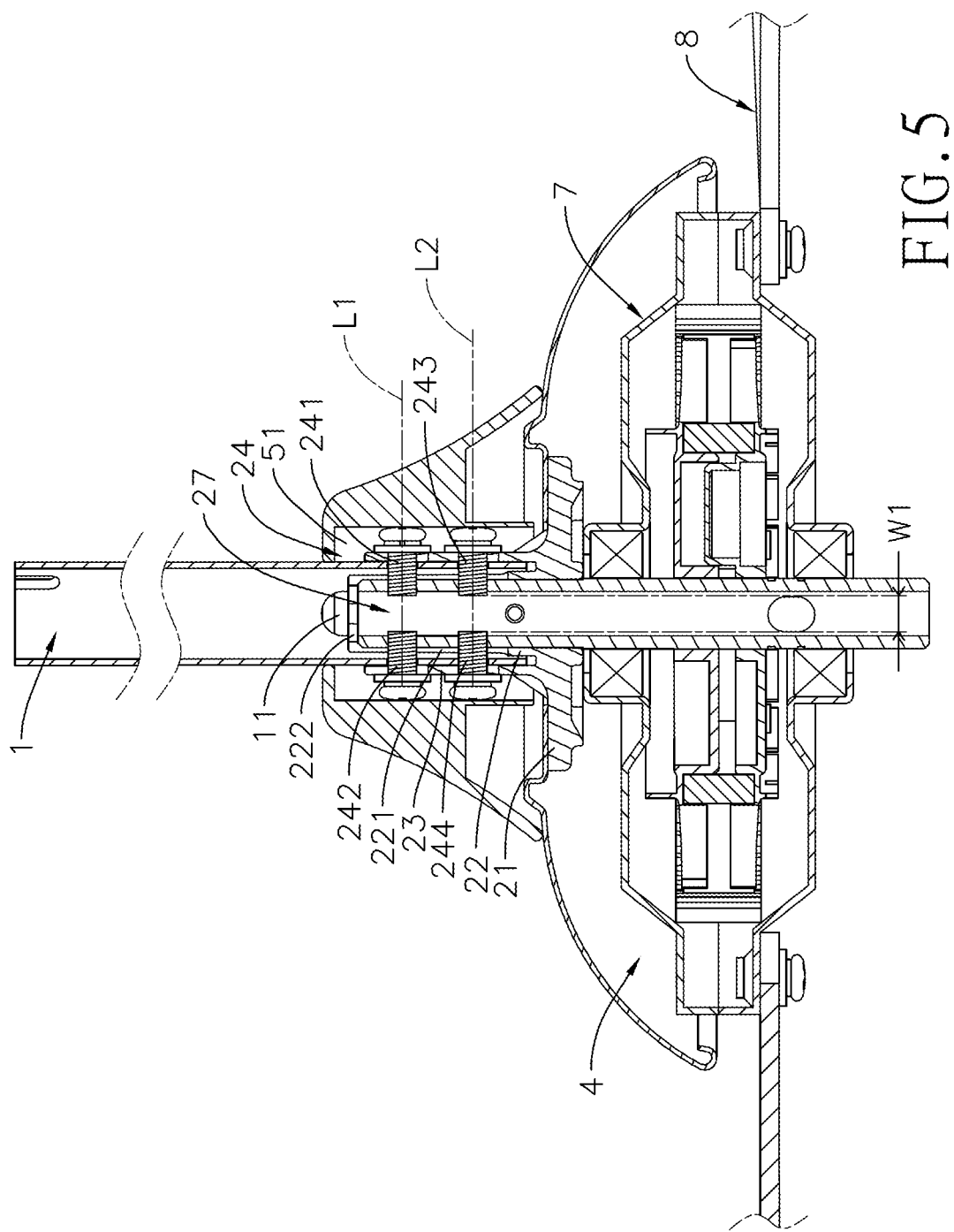
FIG. 5 is another cross-sectional side view of the ceiling fan in FIG. 1.
Figure 6:
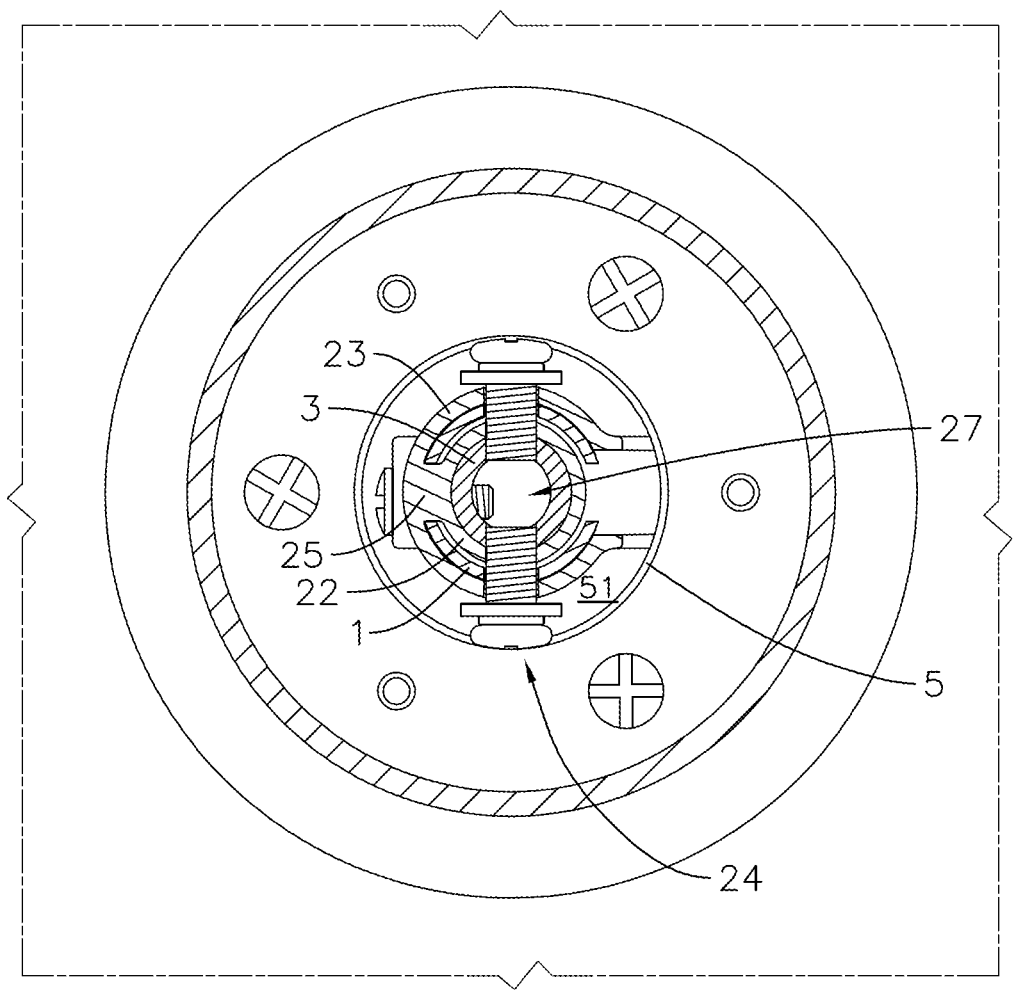
FIG. 6 is a cross-sectional top view of the ceiling fan in FIG. 1.

To be precise, each of the connecting pieces 24 is serially mounted through the second bushing 23, the hanging rod 1, and the motor shaft 3 such that the hanging rod 1, the connecting seat 2, and the motor shaft 3 are connected together. Two of the connecting pieces are respectively a first connecting piece 241 and a second connecting piece 242, and a wire-routing gap 27 (as shown in FIG. 6) is formed between the first connecting piece 241 and the second connecting piece 242. The connecting pieces 24 are preferably components that are used for connection, such as bolts or screws. With reference to FIG. 5, a width W1 of the wire-routing gap 27 is preferably from 6 millimeters to 12 millimeters.

In a conventional ceiling fan (not shown in figures), a bolt is mounted transversely through a motor shaft, hindering routing of electric wires in the ceiling fan and causing inconvenience for overall structure assembly. On the contrary, the connecting pieces 24 of the present invention keep a sufficient space for routing of electric wires inside the motor shaft 3 by forming the wire-routing gap 27, and the connecting pieces 24 ensure structural reliability of the hanging head connecting mechanism. As a result, the connecting pieces 24 prevent hindrance of wire routing, keep the structure simple and reasonable, and maintain ease of installation at the same time.

In the preferred embodiment, a first avoidance hole 221 is formed through a side wall of the first bushing 22 and is configured to avoid the connecting pieces 24. The first avoidance hole 221 allows the first bushing 22 to deform slightly such that when the connecting piece 24 is mounted through the second bushing 23, the hanging rod 1, and the motor shaft 3, the hanging rod 1 and the motor shaft 3 can be fixed together more tightly, thereby ensuring connection strength of the hanging head connecting mechanism.

Figure 4:
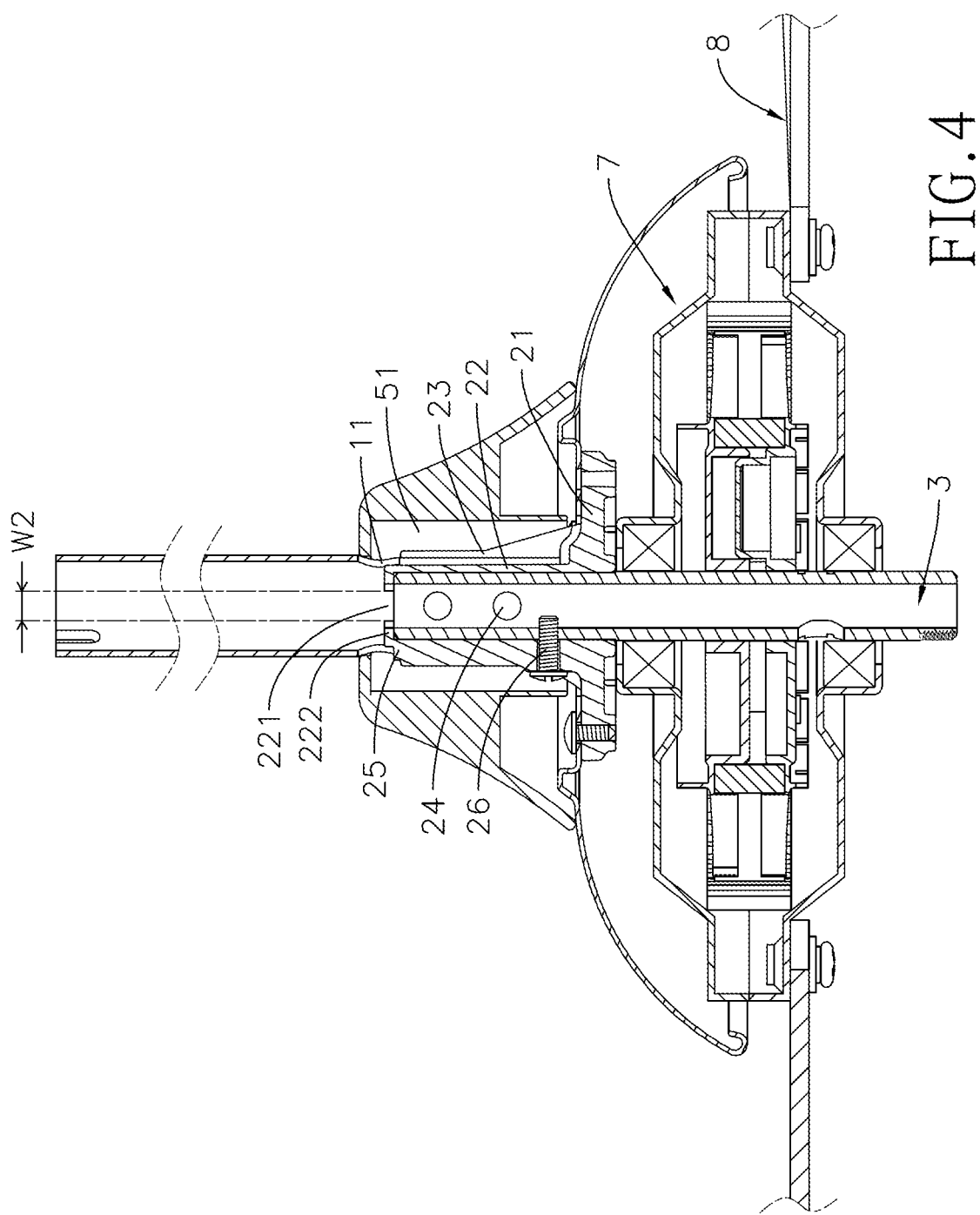
FIG. 4 is a cross-sectional side view of the ceiling fan in FIG. 1.

In the preferred embodiment, the connecting pieces 24 are connecting screws. A width of the first avoidance hole 221 is greater than outer diameters of the connecting pieces 24, and the width W2 (as shown in FIG. 4) of the first avoidance hole 221 is from 7 millimeters to 12 millimeters for ease of installing and tightening the connecting pieces 24 to the hanging rod 1 and the motor shaft 3.

In the preferred embodiment, at least one blocking plate 222 is formed on a top of the first bushing 22 and extends inwardly. A bottom of each of the at least one blocking plate 222 abuts against a top of the motor shaft 3. The blocking plate 222 stops the motor shaft 3 when the motor shaft 3 is moved to its designed installing position in the first bushing 22, thereby facilitating installation of the motor shaft 3 and the connecting seat 2.

In the preferred embodiment, more than one connecting piece 24 is disposed at a specific angular position of the second bushing 23 to improve connection strength between the hanging rod 1, the connecting seat 2, and the motor shaft 3, thereby ensuring structural stability of the hanging head connecting mechanism. As a result, the connecting pieces 24 prevent the ceiling fan from loosening and generating noises during operation.

In the preferred embodiment, the connecting seat 2 further has a connecting block 25, and the connecting block 25, the first bushing 22, and the second bushing 23 are integrally formed as a single part. The connecting block 25 is located between the first bushing 22 and the second bushing 23 to improve connection strength between the first bushing 22 and the second bushing 23.

Moreover, a second avoidance hole 11 is formed in a lower portion of the hanging rod 1 and is configured to avoid the connecting block 25. The second avoidance hole 11 guides the connecting seat 2 to align with the hanging rod 1 during installation, thereby facilitating installation of the hanging rod 1 and the connecting seat 2.

In the preferred embodiment, the connecting seat 2 further has a fixing piece 26 serially mounted through the second bushing 23, the connecting block 25, the first bushing 22, and the motor shaft 3 such that the motor shaft 3 and the connecting seat 2 are connected together. The fixing piece 26 is configured to connect the connecting seat 2 and the motor shaft 3 before connecting the hanging rod 1, the connecting seat 2, and the motor shaft 3 using the connecting pieces 24. As a result, a user only has to align the hanging rod 1 and the connecting seat 2 when installing the connecting pieces 24, making installation of the connecting pieces 24 easy. Without the fixing piece 26, the user needs to manually align the hanging rod 1, the connecting seat 2, and the motor shaft 3 simultaneously in order to install the connecting pieces 24, which is difficult to perform.

Moreover, the fixing piece 26 is connected to the motor shaft 3 after serially mounted through the second bushing 23, the connecting block 25, and the first bushing 22. Contact surface area between the fixing piece 26 and the connecting seat 2 is effectively increased by the connecting block 25, thereby improving connection strength between the connecting seat 2 and the motor shaft 3, and therefore further ensures structural stability of the hanging head connecting mechanism. The fixing piece 26 is preferably a component that is used for connection, such as a bolt or a screw.

The soundproof cover 4 is configured to cover a motor assembly 7 to insulate sound created by the motor assembly 7, thereby reducing noise level of the ceiling fan. To be precise, the soundproof cover 4 is mounted to a lower portion of the connecting seat 2, and a top of the soundproof cover abuts against the top of the connecting plate 21. The soundproof cover 4 has a simple structure and can be firmly fixed. Multiple fan blades 8 are connected to the motor assembly 7.

Moreover, the connecting seat 2 and the soundproof cover 4 can be connected together using fasteners (not shown in figures) serially mounted through the connecting plate 21 and the soundproof cover 4. Said fasteners are preferably components that are used for connection, such as bolts or screws.

To be precise, a number of the connecting pieces 24 is four, and the four connecting pieces 24 are the first connecting piece 241, the second connecting piece 242, a third connecting piece 243, and a fourth connecting piece 244. The first connecting piece 241 and the second connecting piece 242 are each mounted on a respective one of two opposite sides of the second bushing 23. To be more precise, the first connecting piece 241 and the second connecting piece 242 are symmetrically mounted on the two opposite sides of the second bushing 23, and are located along a first horizontal line L1 (as shown in FIG. 5).

The third connecting piece 243 is located right under the first connecting piece 241. The fourth connecting piece 244 is located right under the second connecting piece 242. The third connecting piece 243 and the fourth connecting piece 244 are located along a second horizontal line L2 (as shown in FIG. 5). The four connecting pieces 24 improve structural stability of the hanging head connecting mechanism and keep a smooth operation of the ceiling fan.

The decorative casing 5 covers the connecting seat 2 and improves overall aesthetic appearance of the ceiling fan. A bottom of the decorative casing 5 abuts against the top of the soundproof cover 4.

An accommodating chamber 51 is formed in the decorative casing 5. A wall of the accommodating chamber 51 abuts against the connecting seat 2 such that the decorative casing 5 and the connecting seat 2 are tightly fitted together; that is, with reference to FIGS. 5 and 6, an inner wall of the accommodating chamber 51 is tightly fitted to the connecting piece 24 to prevent noises due to relative vibrations between the connecting seat 2 and the soundproof cover 4.

The ceiling fan comprising the hanging head connecting mechanism effectively improves structural stability of the ceiling fan and prevents noises during operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hanging head connecting mechanism of a ceiling fan comprising:
    a connecting seat having
        a connecting plate;
        a first bushing protruding up from a top of the connecting plate;
        a second bushing protruding up from the top of the connecting plate and located around the first bushing; and
        multiple connecting pieces;
    a hanging rod mounted in an upper end of the connecting seat and disposed between the first bushing and the second bushing; and
    a motor shaft mounted in a lower end of the connecting seat and disposed inside the first bushing;
    wherein each of the connecting pieces is serially mounted through the second bushing, the hanging rod, and the motor shaft such that the hanging rod, the connecting seat, and the motor shaft are connected together; two of the connecting pieces are respectively a first connecting piece and a second connecting piece; the first connecting piece and the second connecting piece are each mounted on a respective one of two opposite sides of the second bushing, and a wire-routing gap is formed between the first connecting piece and the second connecting piece.

2. The hanging head connecting mechanism as claimed in claim 1, wherein a first avoidance hole is formed through a side wall of the first bushing and is configured to avoid the connecting pieces.

3. The hanging head connecting mechanism as claimed in claim 1, wherein
    at least one blocking plate is formed on a top of the first bushing and extends inwardly; and
    a top of the motor shaft abuts against a bottom of each of the at least one blocking plate.

4. The hanging head connecting mechanism as claimed in claim 1, wherein one of the connecting pieces is a third connecting piece; the third connecting piece is located under the first connecting piece.

5. The hanging head connecting mechanism as claimed in claim 1, wherein
    the connecting seat has a connecting block located between the first bushing and the second bushing;
    the connecting block, the first bushing, and the second bushing are integrally formed as a single part.

6. The hanging head connecting mechanism as claimed in claim 5, wherein a second avoidance hole is formed in a lower portion of the hanging rod and is configured to avoid the connecting block.

7. The hanging head connecting mechanism as claimed in claim 5, wherein the connecting seat has a fixing piece serially mounted through the second bushing, the connecting block, the first bushing, and the motor shaft such that the motor shaft and the connecting seat are connected together.

8. The hanging head connecting mechanism as claimed in claim 1, further having a soundproof cover configured to cover a motor assembly and mounted to a lower portion of the connecting seat; a top of the soundproof cover abutting against the top of the connecting plate.

9. The hanging head connecting mechanism as claimed in claim 8, wherein
    the multiple connecting pieces include four connecting pieces; the four connecting pieces are the first connecting piece, the second connecting piece, a third connecting piece, and a fourth connecting piece;
    the first connecting piece and the second connecting piece are located along a horizontal line;
    the third connecting piece is located under the first connecting piece;
    the fourth connecting piece is located under the second connecting piece;
    the third connecting piece and the fourth connecting piece are located along another horizontal line;
    the hanging head connecting mechanism has a decorative casing covering the connecting seat; a bottom of the decorative casing abuts against the top of the soundproof cover; an accommodating chamber is formed in the decorative casing; a wall of the accommodating chamber abuts against the connecting seat;
    a width of the wire-routing gap is from 6 millimeters to 12 millimeters;
    the four connecting pieces are bolts;
    a width of the first avoidance hole is greater than outer diameters of the four connecting pieces; the width of the first avoidance hole is from 7 millimeters to 12 millimeters.

10. A ceiling fan comprising a hanging head connecting mechanism as claimed in claim 9.

11. A ceiling fan comprising a hanging head connecting mechanism as claimed in claim 1.

\* \* \* \* \*